United States Patent [19]

Takeda et al.

[11] Patent Number: 4,510,283

[45] Date of Patent: Apr. 9, 1985

[54] SILICONE-TYPE COATING RESIN SOLUTION

[75] Inventors: Shiro Takeda; Minoru Nakajima, both of Sagamihara, Japan

[73] Assignee: Fujitsu Ltd., Kawasaki, Japan

[21] Appl. No.: 560,170

[22] Filed: Dec. 12, 1983

[30] Foreign Application Priority Data

Dec. 16, 1982 [JP] Japan .................................. 57-219174

[51] Int. Cl.$^3$ ................................................ C08K 5/07
[52] U.S. Cl. ..................................... 524/356; 524/375; 524/376; 524/379; 524/385; 524/391; 525/477; 528/39
[58] Field of Search .......................... 528/39; 525/477; 524/356, 375, 376, 379, 385, 391

[56] References Cited

U.S. PATENT DOCUMENTS 3,529,035 9/1970 Lamoreaux ............................ 528/39
3,624,030 11/1971 Pruvost .................................. 528/39

Primary Examiner—Melvyn I. Marquis
Attorney, Agent, or Firm—Staas & Halsey

[57] ABSTRACT

A silicone-type coating resin solution and a process for preparing the solution. This solution comprises 30 to 60 parts by weight of a hydrolytic condensation polymer of tetramethoxysilane or tetraethoxysilane (PDAS) having a weight average molecular weight of 1,000 to 6,000 and 70 to 40 parts by weight of a polysilsesquioxane prepolymer (PLOS) having a weight average molecular weight of 2,500 to 7,000 and in which each of 5 to 50 mole % of the organic groups attached directly to the silicon atoms is a phenyl group and the remaining organic groups are methyl, ethyl, or vinyl groups, these polymer components being dissolved in an organic solvent having a boiling point of not less than 110° C. under a pressure of 760 mmHg. This solution is prepared by dissolving PDAS and PLOS in an organic solvent having a high boiling point and treating the resultant solution under a reduced pressure of not more than 5 mmHg.

18 Claims, No Drawings

SILICONE-TYPE COATING RESIN SOLUTION

BACKGROUND OF THE INVENTION

The present invention relates to a silicone-type coating resin solution and a process for the preparation thereof. More specifically, the present invention relates to a coating resin solution which is capable of being uniformly applied by spin coating and has a high storage stability and which can be used as an interlayer-insulating material, an orienting layer for display elements, a multilayer resist material, etc.

Use of insulating organic resins capable of being applied by spin coating and exhibiting a leveling function has been proposed for semiconductors, bubble memories, photosensitive materials for electrophotography, liquid crystal elements, and other multilayer-structure devices, or for a multilayer resist material.

Resins used for this have included polyimides, phenolic resins, polysilsesquioxanes, and mixtures of polysilsesquioxanes and tetraalkoxysilane polymers.

For an organic resin to be used as an interlayer insulation layer, it must be capable of satisfying a great number of severe requirements, such as:

1. Uniform application by spin coating;
2. Excellent storage stability;
3. Excellent leveling function;
4. Suitability for wet or dry etching;
5. Easy removal of resist layer;
6. Excellent adhesion to the underlying metallic interconnecting or inorganic oxide layer;
7. Excellent adhesion to the overlaying metallic interconnecting, inorganic oxide or organic resin layer; and
8. Resistance to heat treatment at a temperature of 350° C. to 450° C.

SUMMARY OF THE INVENTION

It is an object of the invention to provide a silicone-type coating resin solution capable of meeting the above-mentioned requirements and a process for producing such a silicone-type coating resin solution.

According to one aspect of the present invention, there is provided a silicone-type coating resin solution comprising 30 to 60 parts by weight of a hydrolytic condensation polymer of tetramethoxysilane or tetraethoxysilane ("PDAS", an abbreviation of polydialkoxysilane) having a weight average molecular weight of 1,000 to 6,000 and 70 to 40 parts by weight of a polysilsesquioxane (hereinafter referred to as "PLOS", an abbreviation of polyladder organosiloxane) prepolymer having a weight average molecular weight of 2,500 to 7,000 in which each of 5 to 50 mole% of the organic groups attached directly to the silicon atoms is a phenyl group and the remaining organic groups are methyl, ethyl, or vinyl groups. These polymer components are dissolved in an organic solvent having a boiling point of not less than 110° C. under a pressure of 760 mmHg.

According to another aspect of the present invention, there is also provided a process for producing a silicone-type coating resin solution, comprising dissolving 30 to 60 parts by weight of PDAS having a weight average molecular weight of 1,000 to 6,000 and 70 to 40 parts by weight of PLOS prepolymer having a weight average molecular weight of 2,500 to 7,000 in which each of 5 to 50 mole% of the organic groups attached directly to the silicon atoms is a phenyl group and the remaining organic groups are methyl, ethyl, or vinyl groups, in an organic solvent having a boiling point of not less than 110° C. under a pressure of 760 mmHg, the parts by weight being calculated in terms of solid content; and treating the resultant solution under a reduced pressure of not greater than 5 mmHg.

According to the present invention, there is also provided a process for producing a silicone-type coating resin solution having a solids concentration of 20% to 50% by weight, comprising: dissolving 30 to 60 parts by weight of PDAS having a weight average molecular weight of 1,000 to 6,000 in an organic solvent having a boiling point of not less than 110° C. under a pressure of 760 mmHg, the parts by weight being calculated in terms of solids content; treating the obtained PDAS under a reduced pressure of not greater than 5 mmHg; and mixing the thus treated PDAS solution with a solution of 70 to 40 parts by weight of PLOS having a weight average molecular weight of 2,500 to 7,000 in which each of 5 to 50 mole% of the organic groups attached directly to the silicon atoms is a phenyl group and the remaining organic groups are methyl, ethyl, or vinyl groups, in an organic solvent having a boiling point of not less than 110° C. under a pressure of 760 mmHg.

The resin solution obtained by the process of the present invention has a solids concentration of 20% to 50% by weight and a halogen content of not greater than 10 ppm.

In the process invention, the PDAS is employed in the form of an organic solvent solution in which 20% to 50% by weight of the solids concentration is PDAS. As the organic solvent, an alcohol is preferable.

DESCRIPTION OF THE PREFERRED EMBODIMENTS

PDAS is known from Japanese Unexamined Patent Publication (Kokai) Nos. 48-81928 and 48-26822. The PDAS solution is prepared in accordance with the following formulas (1) and (2):

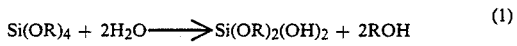

$$Si(OR)_4 + 2H_2O \longrightarrow Si(OR)_2(OH)_2 + 2ROH \quad (1)$$

$$nSi(OR)_2(OH)_2 \longrightarrow HO\!\!-\!\![Si(OR)_2O]_n\!\!-\!\!H + (n-1)H_2O \quad (2)$$

in which R is methyl or ethyl.

PLOS is known from Japanese Unexamined Patent Publication (Kokai) No. 57-131250. When R'SiCl₃ is used for polymerization as a starting monomer, a ladder PLOS of the following formula can be obtained:

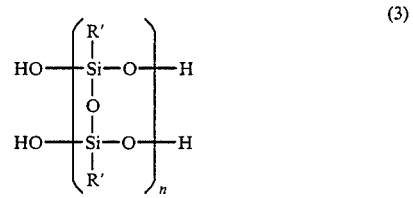

(3)

in which, R' is a monovalent organic radical such as methyl, ethyl, vinyl, propyl, or phenyl (see Japanese Unexamined Patent Publication (Kokai) No. 53-88099).

When R'Si(OR)₃ is used for polymerization as a starting monomer, PLOS having a partial ladder structure of the following formula can be obtained:

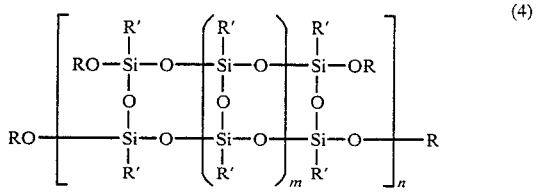

in which R is mostly a relatively small hydrocarbon radical such as methyl, ethyl, propyl, or butyl and partly hydrogen; R' is a monovalent organic radical such as methyl, ethyl, vinyl, propyl, or phenyl; and m and n are a positive integer, most of m being 0 to 10.

A PDAS-PLOS prepolymer mixture may be formed into a uniform coating by using a Cellosolve (Trademark) acetate solvent, as disclosed in Japanese Unexamined Patent Publication No. 55-158114. Minute investigations by the present inventors have revealed, however, that the uniform film-forming property of the PDAS-PLOS prepolymer mixture is influenced by the molecular weight of the PDAS and the PLOS prepolymer and the treatment conditions of the resin solution. That is, it is desirable that the PDAS have a weight average molecular weight of not greater than 6,000, preferably not greater than 4,500, in terms of polystyrene, as measured by gel permeation chromatography. Also, it is desirable that the PLOS prepolymer have a weight average molecular weight of not greater than 7,000, preferably not greater than 6,500. It was found that a combination of these polymers can provide a uniform coating by means of spin coating. If the molecular weight is too small, i.e., the amount of the reactive groups is too large, during curing heat treatment, there are formed a large amount of condensation reaction products which generate an excessive amount of strain in the coating film, whereby undesirable phenomena such as cracking occur in the film. Investigations proved that it is convenient that the PDAS have a weight average molecular weight of not less than 1,000, desirably not less than 1,600, and that the PLOS prepolymer have a weight average molecular weight of not less than 2,500, desirably not less than 3,000.

If the molecular weight of the PDAS is more than 6,000 and the molecular weight of the PLOS is more than 7000, the obtained PDAS-PLOS prepolymer mixture is hardly soluble in the organic solvent. This results in a nonuniform film by spin coating. Therefore, the PDAS should have a weight average molecular weight of not more than 6,000, and the PLOS should have a weight average molecular weight of not more than 7,000.

The weight ratio of PDAS to PLOS in this invention is in the range of 3:2 to 3:7. This mixing ratio is preferably selected from the standpoint of adhesion to a metal like aluminum and of film formability. If the ratio is outside of the above-mentioned range, the adhesion to aluminum of the film from the resin solution is poor and only a thin film can be obtained.

The phenyl group in the PLOS prepolymer should be in the range of 5 to 50 mole% of the organic radicals attached directly to silicon atoms. If the phenyl group content is less than 5 mole%, the storage stability is poor. If the phenyl group contact is more than 50 mole%, the adhesion to the overlaying metallic layer or inorganic oxide layer is poor.

The lower the pressure in the reduced-pressure treatment of the mixed resin solution, the better, since one can reduce the treatment time under a lower reduced-pressure. In the present invention, the pressure of the treatment for the PDAS-PLOS solution is not more than 5 mmHg, preferably not more than 3 mmHg.

The temperature for the reduced-pressure treatment is not more than 40° C. in order to avoid changes in property of the PDAS. The preferred temperature is between 5° C. and 28° C.

For the reduced-pressure treatment, a rotary evaporator is preferably used.

By the above reduced-pressure treatment of the PDAS-PLOS solution, it is possible to reduce the chloride ion content in the PDAS-PLOS solution to a level undetectable by silver nitrate. The content of chloride ion is assumed to be not more than 10 ppm. In fact, no chloride content could be detected by quantitative analysis with a 10 ppm measuring limit.

The PDAS solution is generally prepared by mixing a tetraalkoxysilane with an organic solvent and by adding an aqueous solution of hydrochloric acid, acetic acid, or the like to the mixture. It was proved that the use of a relatively large tetraalkoxysilane such as tetrapropoxysilane or tetrabuthoxysilane may cause a strain in the coating film even if the resultant PDAS has the above-specified molecular weight, because such a tetraalkoxysilane has a high content of a reactive group. Therefore, it is preferable to use tetraethoxysilane or tetramethoxysilane. Furthermore, it was proved that the added acid is almost all evaporated away during coating and curing. It was also provided, however, that even a very small acid residue not only reduces the long-term reliability of the apparatus, but also adversely affects the storage stability of the mixed resin solution.

That is, for example, even if a resin solution prepared by mixing a PDAS solution containing 0.05% by weight of hydrochloric acid which is derived from the polymerization catalyst with a PLOS prepolymer and by adding butyl Cellosolve acetate to the mixture is stored in a refrigerator, it gels to a jellylike form 5 to 30 days later. Further, when the resin solution is used prior to gelling, as an insulating material between interconnecting layers for a bubble memory, for example, operation failure occurs after a bias test of about 200 hours. If the chloride ion concentration of the PDAS solution is reduced to 10 ppm or less, however, the resin solution does not gel even after 90 to 180 days and has a uniform coating property. Furthermore, it was found that when such a resin solution is used for a bubble memory, no operation failure occurs even after a bias test of 1000 hours. The present inventors discovered that when a PDAS solution or PDAS-PLOS mixture is mixed with an organic solvent having a boiling point of not less than 110° C., desirably one selected from the group consisting of Cellosolve acetates (ethylene glycol monoether acetates), for example, methyl Cellosolve acetate (ethylene glycol monomethyl ether acetate, $CH_3COOCH_2CH_2OCH_3$), ethyl Cellosolve acetate (ethylene glycol monoethyl ether acetate, $CH_3COOCH_2CH_2OC_2H_5$), and butyl Cellosolve acetate (ethylene glycol monobutyl ether acetate, $CH_3COOCH_2CH_2OC_4H_9$), ketones, for example methyl isobutyl ketone, and alcohols, for example, n-butyl alcohol, and the resultant mixture is subjected to evaporation under a reduced pressure of not greater than 5 mmHg, desirably not greater than 3 mmHg, the hydrochloric acid contained in the solution can be removed together with, for example, the alcohol resulting from the starting silane until no chloride ions can be detected in the solution. Among the above-mentioned solvents, Cellosolve acetates are preferable.

In the case where a solvent having a boiling point of less than 110° C. is used, the solvent evaporates too rapidly to be replaced by a new solvent, and the PDAS concentration is increased, with the result that gelling occurs.

It was proved that if a resin solution capable of being used as an insulating material between interconnecting layers is desired, the PLOS used is limited in addition to the molecular weight, from the viewpoints of adhesion to the overlaying metallic interconnection, thermal stability at a high temperature, and storage stability of the gas-evolving resin solution itself.

For example, the organic group attached directly to the silicon atom should essentially be a hydrocarbon group having up to two carbon atoms, selected from the methyl, ethyl, and vinyl group, or a phenyl group. Of the organic group is a chain hydrocarbon group having three or more carbon atoms, an excessive amount of gas is evolved on exposure to a high temperature of 350° C. or more, which may generate a blister in the overlaying metallic layer. The ideal organic group is a methyl group in view of thermal resistance. In this case, the resultant resin solution not only has a thermal decomposition temperature of about 700° C. in a nitrogen atmosphere, but is also excellent in adhesion to the overlaying metallic layer or inorganic oxide layer, for example, a silicon dioxide ($SiO_2$) layer formed by sputtering or a phospho-silicate glass layer formed by vapor deposition.

A mixed solution comprising a PLOS prepolymer containing a methyl group alone and PDAS, however, has poor storage stability. Even if other conditions are advantageous, the solution gels within about 30 days or the coating film resulting from the solution has an increased surface roughness after curing. This is possibly because the reactive groups are likely to collide with each other due to the small size of the methyl group. Therefore, it is considered to be effective to incorporate an organic group liable to cause steric hindrance, for example, a phenyl group, into the PLOS prepolymer. In fact, a phenyl group content of 5 mole% enables the resultant resin solution to exhibit good storage stability. As the phenyl group content is increased, the storage stability is gradually enhanced. It was found, however, that increasing the phenyl group results in deterioration of the adhesion of the resin solution to the overlaying metallic layer or inorganic oxide layer. It was found to be preferable, from the viewpoint of the above-mentioned adhesion, that not greater than 50 mole%, more preferably 10 to 40 mole%, of the organic groups attached directly to the silicon atoms in the PLOS prepolymer, be a phenyl group.

In addition, it was discovered that the compounding proportion of a PLOS prepolymer of such a composition and a PDAS satisfying the above-mentioned conditions has a great influence on the adhesion of the resin solution to the overlaying metallic layer or inorganic oxide layer. This is further illustrated below. For example, when an aluminum layer is formed on a mixed resin layer of $SiO_2$-PLOS, which is obtained from a PDAS-PLOS prepolymer mixture solution by coating and curing, the adhesion of the resin layer to the aluminum layer is improved over the adhesion of a $SiO_2$ layer to an aluminum layer, which $SiO_2$ layer is obtained by curing PDAS alone, or the adhesion of a cured PLOS layer resulting from the PLOS prepolymer alone to the aluminum layer. This improvement can be observed even when the compounding proportion of either of these polymer components is very small.

A weight ratio of PDAS/PLOS of about 50:50, however, provides maximum adhesion. Weight ratios of 30:70 and 60:40 provide about 85% of the adhesion of a weight ratio of 50:50. The degree of adhesion which is practically required varies depending on the type of the device to which the resin solution is applied. Thus, it is difficult to define the weight ratio. It is, however, desirable that the weight ratio of PDAS/PLOS prepolymer be in the range of from 3:7 to 6:4.

The total solids concentration of the resin solution is in the range of from 20% to 50% by weight. For example, if the resin is to be coated on an aluminum interconnection having a thickness of 1 μm, in consideration of the leveling effect of the resin, the resin should be coated on the wafer under a condition such that it can be coated on a flat plate in a thickness of at least 0.2 μm, desirably at least 0.3 μm, by spin coating.

Furthermore, it is necessary that the speed of the spin coater be at least 2,000 rpm, desirably at least 3,000 rpm. If the speed is less than 2,000 rpm, the layer thickness at the end of a wafer will be twice that at the center thereof, which results in a non-uniform treatment at the subsequent etching step.

Because of this limitation, the solids concentration of the resin solution should be at least 20% by weight regardless of the resin composition and the solvent composition. On the other hand, if the solids concentration of the resin solution is increased to more than 50% by weight with a view to obtain a thicker layer, the resin solution is likely to gel, and the uniform coating property thereof is deteriorated. Therefore, it is desirable that the solids concentration of the resin solution be not greater than 45% by weight.

With regard to the storage stability or uniform coating property of the resin solution, it is advantageous that the resin solution have a lower solids concentration. If a resin solution having a solids concentration of not greater than 5% or a resin solution providing a layer thickness of not greater than 0.1 μm were to be prepared, neither the composition of the resin solution nor the limitations of the production process of the present invention would be necessary.

In the process of the present invention, the order of addition of PDAS and the PLOS prepolymer to the solvent prior to reduced pressure treatment is arbitrary.

The present invention is further illustrated below by the following examples and comparative examples, which by no means limit the scope of the invention.

EXAMPLE 1

A 10 g amount of a polymethylphenylsilsesquioxane prepolymer having a weight average molecular weight of 5,400 and a molar ratio of the methyl group to phenyl group of 2 to 1 and 30 g of butyl Cellosolve acetate (BCA) were added to 67 g of a 15% by weight ethyl alcohol solution of a tetraethoxysilane polymer having a weight average molecular weight of 2,800 and containing 0.05% by weight of hydrochloric acid. After the mixture was mixed and dissolved, the solution was placed in an eggplant-shaped flask connected to a rotary evaporator and was treated under a reduced pressure of 2.0 mmHg for 4 hours. Then, the solution was filtered by using a 0.1 μm mesh filter to obtain a resin solution I. A 10 g amount of the resin solution I and 20 g of water were placed in a separating funnel. The funnel was shaken for 3 hours. After the aqueous layer was separated, 10 drops of an aqueous 0.5% AgNO$_3$ solution were added to the aqueous layer. The aqueous layer was transparent.

The resin solution I was spin coated on a silicon wafer at 6,000 rpm for 90 seconds. The coated solution layer on the wafer was heat-treated at 120° C. for 30 minutes, and then at 450° C. for 60 minutes to cure the layer. The coating film had a thickness of 0.7 μm. Examination by an optical microscope at a magnification of 1,000 did not reveal any extraneous matter or any abnormality in the film.

Separately, the resin solution I was coated on a garnet wafer on which a Permalloy layer (Hc 1.0 Oe) is formed under the same conditions and was heat-treated at 120° C. for 30 minutes and then at 300° C. for 60 minutes in a nitrogen (N$_2$) atmosphere. The resultant film had a thickness of 0.7 μm. No abnormality was observed in both the resin film and the Permalloy layer. Also, the Permalloy layer exhibited an Hc of 1.0 Oe. After the resin solution was stored at room temperature for 90 days, neither gelling nor change in the coating film thickness occurred.

COMPARATIVE EXAMPLE 1

A tetraethoxysilane polymer solution as used in Example 1 was coated on a Permalloy layer as used in Example 1 at 3,000 rpm for 30 seconds and was heat treated at 120° C. for 30 minutes and then at 300° C. for 60 minutes in a nitrogen (N$_2$) atmosphere.

The resin film had unevennesses radiating in all directions from the center thereof and had an average thickness of 0.25 μm. The Permalloy layer had a slightly reduced luster, and the Hc was increased to 8.2 Oe.

COMPARATIVE EXAMPLE 2

A mixed solution comprising the tetraethoxysilane polymer solution, the polymethylphenylsilsesquioxane, and BCA, as used in Example 1, was placed in a polyethylene bottle without treatment under reduced pressure. The bottle was then tightly stoppered and stored in a refrigerator for 30 days. The solution became jelly-like.

COMPARATIVE EXAMPLE 3

A mixed solution as used in Example 1 was treated under a reduced pressure of 6 mmHg for 8 hours. The solution was then coated on a silicon wafer and was cured in the same manner as that described in Example 1. The resultant film had a number of spots on the surface thereof. The spots had a diameter of 1 to 10 μm and protruded 100 to 150 Å from the film surface. Analysis by an X-ray microanalyzer indicated that the spots had a higher silicon content than that of the other portions.

When the mixed solution was treated under a reduced pressure of 5 mmHg for 4 hours and then coated on 10 wafers and cured, spots were observed on one of these wafers.

COMPARATIVE EXAMPLE 4

A resin solution was prepared in the same manner as that described in Example 1, except that a tetraethoxysilane polymer having a weight average molecular weight of 6,500 and a polymethylphenylsilsesquioxane prepolymer having a weight average molecular weight of 8,000 were used.

Using this resin solution, the same coating and curing procedures as those described in Example 1 were carried out. The resultant film had the same spots as in Comparative Example 3.

When a tetraethoxysilane polymer having a weight average molecular weight of 6,000 and a polymethylphenylsilsesquioxane prepolymer having a weight average molecular weight of 7,000 were used, few spots were observed, but the probability that a spot would appear was 2/23.

COMPARATIVE EXAMPLE 5

A mixed resin solution was prepared in the same manner as that described in Example 1, except that a polymethylsilsesquioxane prepolymer having a weight average molecular weight of 5,200 was used as the polysilsesquioxane prepolymer. The resultant solution was stored in a refrigerator (5° C. to 7° C.).

The resin solution was tested and evaluated in a similar manner as that described in Example 1. Almost the same results were obtained 14 days after the preparation of the resin solution. After 18 days storage, however, the coating film had spots, and after 23 days storage, the resin solution became viscous.

EXAMPLE 2

A 85 g amount of methyl Cellosolve acetate was added to 100 g of a 15% by weight ethyl alcohol solution of a tetraethoxysilane polymer having a weight average molecular weight of 2,800 and containing 0.05% by weight of chloride ions. The resultant solution was treated under a reduced pressure of 2.5 mmHg for 3 hours. To this solution was added methyl Cellosolve acetate (MCA) so as to bring the amount of the solution to 75 g (solids concentration 20%). (PDAS solution II).

Separately, there was prepared a 40% by weight solution of a polymethylphenylsilsesquioxane prepolymer having a weight average molecular weight of 4,900 and a molar ratio of methyl group to phenyl group of 3 to 1, dissolved in BCA (PLOS solution II).

The PDAS solution I was mixed with the PLOS solution II to prepare solutions of different solids ratios. BCA was added to each solution in an amount such that a 0.5 μm thick coating film was obtained by spin coating and heat treatment.

Then, the resin solution was coated on a silicon wafer on which a SiO$_2$ layer having a thickness of 5,100 Å was formed by thermal oxidation and was cured in a nitrogen atmosphere at 300° C. for 60 minutes. Thereafter, an aluminum layer of 1.0 μm thickness was formed on the coating film by vapor deposition. The aluminum layer was cut longitudinally and laterally at an interval of 1 mm by using a laser so as to form 100 squares thereon. This wafer was introduced into distilled water and was boiled for 60 minutes. After drying, a peeling test using an adhesive tape was applied to the dried wafer. The adhesion of the resin film to the aluminum layer was evaluated on the basis of the remaining aluminum squares. The results are shown in the table.

TABLE

| Property | Influence of Ratio of Mixing Mixed ratio of PDAS to PLOS (weight ratio) | | | | | | | |
|---|---|---|---|---|---|---|---|---|
| | 100:0 | 80:20 | 60:40 | 50:50 | 40:60 | 30:70 | 20:80 | 0:100 |
| Adhesive property Al (%) | 25 | 42 | 85 | 100 | 98 | 87 | 68 | 54 |

TABLE-continued

| Property | Influence of Ratio of Mixing Mixed ratio of PDAS to PLOS (weight ratio) | | | | | | | |
|---|---|---|---|---|---|---|---|---|
| | 100:0 | 80:20 | 60:40 | 50:50 | 40:60 | 30:70 | 20:80 | 0:100 |
| Formable film thickness (μm) | 0.55 | 1.0 | 1.8 | 2.1 | 2.0 | 1.8 | 1.6 | 0.8 |

Further, the concentration of the mixed resin solution was varied and the resin solution was coated in various thickness. Then, the coated solution layer was cured in a nitrogen atmosphere at 450° C. for 60 minutes. The film thickness at which no cracking occurred in the resin film was measured.

The results are shown in the table. It is apparent from the table that the preferable compounding ratio of PDAS to PLOS is in the range of 6:4 to 3:7, although this is somewhat variable depending on the type of the resin.

COMPARATIVE EXAMPLE 6

A mixed resin solution having a compounding ratio, by weight, of PDAS/PLOS of 1:1 was prepared by using the PDAS solution II prepared in Example 2 and a polymethylphenylsilsesquioxane prepolymer having a weight average molecular weight of 3,500 and a molar ratio of methyl to phenyl of 4:6.

This resin solution was tested in a similar manner to that described in Example 2. The adhesion of the resin film to the aluminum layer was 72%, and the formable film thickness was 2.7 μm. It is evident from these test results that the resin solution is advantageous with respect to the formable film thickness, but not with respect to the adhesion to the overlaying metallic layer.

When the same test was carried out using a polymethylphenylsilsesquioxane prepolymer having a molar ratio of methyl to phenyl of 5:5, the adhesion of the resin film to the aluminum layer was 83%. When a polymethylphenylsilsesquioxane prepolymer having a molar ratio of methyl to phenyl of 4:6 was used, the adhesion of the resin film to the aluminum layer was 88%. In the case where the polysilsesquioxane prepolymer contains a phenyl group alone, the adhesion of the resin film to the aluminum layer was 32%.

COMPARATIVE EXAMPLE 7

A mixed resin solution consisting of a 20 wt% BCA solution of a tetramethoxysilane polymer having a weight average molecular weight of 950 (PDAS solution III) and a polymethylphenylsilsesquioxane prepolymer solution (the prepolymer has a weight average molecular weight of 2,000 and a molar ratio of methyl to phenyl of 6:4) (PLOS solution III) in a weight ratio of 1:1 in terms of solids content, was prepared. The maximum film thickness which can be formed without any cracks was 1.2 μm.

In the case of a mixed solution consisting of the PDAS solution III and the PLOS solution II used in Example 2, the maximum film thickness was 1.4 μm. In the case of a combination of the PLOS solution III and the PDAS solution used in Example 2, the maximum film thickness was 1.5 μm.

EXAMPLE 3

The same test as in Comparative Example 7 was effected using a solution of a tetramethoxysilane polymer having a weight average molecular weight of 1,600 and a polymethylphenylsilsesquioxane prepolymer having a weight average molecular weight of 3,000. The maximum film thickness was 1.8 μm.

EXAMPLE 4

A mixed resin solution comprising the PDAS solution III and a polymethylphenylsilsesquioxane prepolymer having a weight average molecular weight of 5,800 and a molar ratio of methyl to vinyl to phenyl of 4:2:4 in a weight ratio of 1:1 in terms of solids content, was prepared. The solvent used was a 2:1 (by weight) mixture of MCA and BCA. The solids concentration of the resin solution was 41 wt%.

The resin solution was coated on a silicon wafer on which a SiO$_2$ layer is formed under the conditions of 2,500 rpm and 90 seconds. The coated solution layer was dried at 120° C. for 60 minutes to remove the solvent and was then cured in a nitrogen atmosphere at 320° C. for 60 minutes. The coating film had a thickness of 1.8 μm. An aluminum layer of 1.0 μm thickness was formed on the film and was left to stand in air at 450° C. for 60 minutes. No abnormality was observed. As a result of the adhesion test, the adhesion of the resin film to the aluminum layer was 100%. No peeling of the resin film itself occurred.

EXAMPLE 5

A solution diluted by adding 30 g of BCA to the resin solution obtained from Example 1 was spin coated in the air at 3,000 rpm for 60 seconds on the surface of a transparent electroconductive film overlaying a glass base. This was heat-treated first at 120° C. for 30 minutes and then at 300° C. for 60 minutes to cure the resin. The thus obtained cured PDAS-PLOS film was rubbed, and a liquid crystal mixture consisting mainly of a cyanocyclohexane-type liquid crystal was encapsulated in a dry panel to prepare a twisted nematic-type liquid crystal display having a cell gap of 6 μm. Observation by a polarization microscope revealed no domain and showed fairly good liquid crystal orientation. The PDAS-PLOS film had a good insulation property. Therefore, there was no need for a further insulating film such as silicon dioxide for the transparent electrode.

We claim:

1. A silicone coating resin organic solvent solution comprising
   - 30 to 60 parts by weight of a hydrolytic condensation polymer of tetramethoxysilane or tetra-ethoxysilane having a weight average molecular weight of 1,000 to 6,000,
   - 70 to 40 parts by weight of a polysilsesquioxane prepolymer having a weight average molecular weight of 2,500 to 7,000, in which each of 5 to 50 mole% of the organic groups attached directly to the silicon atoms of the polysilsesquioxane prepolymer is a phenyl group and the remaining organic groups are methyl, ethyl, or vinyl groups, and
   - said solvent being an organic compound having a boiling point of not less than 100° C. under a pressure of 760 mmHg.

2. A solution as claimed in claim 1, wherein the halogen content is not greater than 10 ppm.

3. A solution as claimed in claim 1, wherein the solvent is chosen from the group consisting of ethylene glycol monoether acetates, ketones and alcohols.

4. A silicone coating resin solution as claimed in claim 3, wherein the solvent is chosen from the group consisting of ethylene glycol monomethyl ether acetate, ethylene glycol monoethyl ether acetate, ethylene glycol monobutyl ether acetate, methyl isobutyl ketone and n-butyl alcohol.

5. A solution as claimed in claim 1, wherein the solvent is ethylene glycol monobutyl ether acetate.

6. A process for producing a silicone coating resin organic solvent solution comprising:
dissolving 30 to 60 parts by weight of a hydrolytic condensation polymer of tetramethoxysilane or tetraethosysilane having a weight average molecular weight of 1,000 to 6,000 and 70 to 40 parts by weight of a polysilsesquioxane prepolymer having a weight average molecular weight of 2,500 to 7,000 and in which each of 5 to 50 mole% of the organic groups attached directly to the silicon atoms is a phenyl group and the remaining organic groups are methyl, ethyl, or vinyl groups, in said solvent which is selected to be of an organic compound and to have a boiling point of not less than 110° C. under a pressure of 760 mmHg, said parts by weight being calculated in terms of solids content; and
treating the resultant solution under a reduced pressure of not greater than 5 mmHg.

7. A process for producing a silicone coating resin organic solvent solution comprising:
dissolving 30 to 60 parts by weight of a hydrolytic condensation polymer of tetramethoxysilane or tetraethosysilane having a weight average molecular weight of 1,000 to 6,000 in a solvent having a boiling point of not less than 110° C. under a pressure of 760 mmHg, said parts by weight being calculated in terms of solids content;
treating the resultant solution under a reduced pressure of not greater than 5 mmHg.
mixing the thus treated hydrolytic condensation polymer of tetramethoxysilane or tetraethosysilane solution with a solution of 70 to 40 parts by weight of a polysilsesquioxane prepolymer having a weight average molecular weight of 2,500 to 7,000 and in which each of 5 to 50 mole% of the organic groups attached directly to the silicon atoms is a phenyl group and the remaining organic groups are methyl, ethyl, or vinyl groups, in said solvent which is selected to be of an organic compound and to have a boiling point of not less than 110° C. under a pressure of 760 mmHg.

8. The solution of claim 2, wherein the solvent is chosen from the group consisting of ethylene glycol monoether acetates, ketones and alcohols.

9. The solution of claim 8, wherein the solvent is chosen from the group consisting of ethylene glycol monomethyl ether acetate, ethylene glycol monoethyl ether acetate, ethylene glycol monobutyl ether acetate, methyl isobutyl ketone and n-butyl alcohol.

10. The solution of claim 2, wherein the solvent is ethylene glycol monobutyl ether acetate.

11. The solution of claim 1 or 2, comprising a solids concentration in the range from 20 to 50% by weight.

12. The process of claim 6 or 7, wherein said resin coating solution is formed with a solids concentration range from 20 to 50% by weight.

13. The process of claim 6 or 7, comprising conducting said treating of said solution under a reduced pressure of not more than 3 mmHg.

14. The process of claim 6 or 7, comprising conducting said treating of said solution under said reduced pressure at a temperature of not more than 40° C.

15. The process of claim 13, comprising conducting said treating of said solution under said reduced pressure at a temperature in the range from 5° to 28° C.

16. The process of claim 6 or 7, wherein each of 10 to 40 mole% of the organic groups attached directly to the silicon atoms of the polysilsesquioxane prepolymer is a phenyl group and the remaining organic groups are methyl, ethyl or vinyl groups.

17. The solution of claim 1 or 2 said solvent being a polar solvent.

18. The process of claim 6 or 7, wherein the solvent is selected to be a polar solvent.

* * * * *

UNITED STATES PATENT AND TRADEMARK OFFICE
CERTIFICATE OF CORRECTION

PATENT NO. : 4,510,283
DATED : April 9, 1985
INVENTOR(S) : Shiro Takeda et al

It is certified that error appears in the above-identified patent and that said Letters Patent is hereby corrected as shown below:

On the title page:

[73], Assignee, "Fujitsu Ltd." should be --Fujitsu Limited--.

Signed and Sealed this

Third Day of December 1985

[SEAL]

Attest:

DONALD J. QUIGG

Attesting Officer

Commissioner of Patents and Trademarks